(12) United States Patent
Higashi et al.

(10) Patent No.: US 12,088,913 B2
(45) Date of Patent: Sep. 10, 2024

(54) IMAGING APPARATUS, INFORMATION PROCESSING METHOD, AND STORAGE MEDIUM

(71) Applicant: CANON KABUSHIKI KAISHA, Tokyo (JP)

(72) Inventors: Hidenori Higashi, Kanagawa (JP); Koji Okawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 18/058,146

(22) Filed: Nov. 22, 2022

(65) Prior Publication Data

US 2023/0171488 A1 Jun. 1, 2023

(30) Foreign Application Priority Data

Nov. 26, 2021 (JP) .................... 2021-192446

(51) Int. Cl.
*H04N 23/661* (2023.01)
*G06V 10/44* (2022.01)
*H04N 23/67* (2023.01)

(52) U.S. Cl.
CPC .......... *H04N 23/661* (2023.01); *G06V 10/44* (2022.01); *H04N 23/67* (2023.01); *H04N 23/671* (2023.01)

(58) Field of Classification Search
CPC .... H04N 23/661; H04N 23/67; H04N 23/671; H04N 1/00031; H04N 1/00127; H04N 1/00; G06V 10/44; G06V 20/46; G06V 40/10
See application file for complete search history.

(56) References Cited

U.S. PATENT DOCUMENTS

| 7,623,176 B2* | 11/2009 | Hoshino | H04N 5/222 348/333.02 |
| 11,170,520 B2* | 11/2021 | Takami | H04N 21/23418 |
| 11,240,480 B2* | 2/2022 | Tsukagoshi | H04N 21/234318 |
| 2010/0232648 A1* | 9/2010 | Nishino | H04N 23/611 382/103 |
| 2016/0205341 A1* | 7/2016 | Hollander | H04N 19/46 375/240.08 |
| 2021/0006769 A1* | 1/2021 | Tsukagoshi | H04N 13/178 |

FOREIGN PATENT DOCUMENTS

JP 2010009134 A 1/2010

* cited by examiner

*Primary Examiner* — Hung H Lam
(74) *Attorney, Agent, or Firm* — Canon U.S.A., Inc. IP Division

(57) ABSTRACT

An imaging apparatus includes a processor executing instructions which, when executed by the processor, cause the imaging apparatus to detect an object included in an image captured by an imaging unit, generate meta data conforming to annotated regions supplemental enhancement information (ARSEI) including positional information for the object detected from the image, and transmit transmission data including coded data generated by encoding the image and the meta data related to the image to an external apparatus, wherein, in a case where a variation of a parameter of a first object detected from a second image captured after a first image with respect to the parameter of the first object detected from the first image is less than a threshold value, meta data not including positional information for the first object in the second image is generated as meta data related to the second image.

10 Claims, 9 Drawing Sheets

```
annotated_regions( payloadSize ) {
    ar_cancel_flag
    if( !ar_cancel_flag ) {
        ar_not_optimized_for_viewing_flag
        ar_true_motion_flag
        ar_occluded_object_flag
        ar_partial_object_flag_present_flag
        ar_object_label_present_flag
        ar_object_confidence_info_present_flag
        if( ar_object_confidence_info_present_flag )
            ar_object_confidence_length_minus1
        if( ar_object_label_present_flag ) {
            ar_object_label_language_present_flag
            if( ar_object_label_language_present_flag ) {
                while( !byte_aligned( ) )
                    ar_bit_equal_to_zero /* equal to 0 */
                ar_object_label_language
            }
            ar_num_label_updates
            for( i=0; i < ar_num_label_updates; i++ ) {
                ar_label_idx[ i ]                                          —301
                ar_label_cancel_flag
                LabelAssigned[ ar_label_idx[ i ] ] = !ar_label_cancel_flag
                if( !ar_label_cancel_flag ) {
                    while( !byte_aligned( ) )
                        ar_bit_equal_to_zero /* equal to 0 */
                    ar_label[ ar_label_idx[ i ] ]                          —302
                }
            }
```

IMAGING APPARATUS, INFORMATION PROCESSING METHOD, AND STORAGE MEDIUM

BACKGROUND OF THE DISCLOSURE

Field of the Disclosure

The present disclosure relates to an information processing method.

Description of the Related Art

High Efficiency Video Coding (HEVC) (referred to as H.265 (11/2019) High Efficiency Video Coding by International Telecommunication Union Telecommunication Standardization Sector (ITU-T)) is known as an encoding method of moving images. Annotated regions supplemental enhancement information (ARSEI) in the HEVC standard enables transmission of positional information and label information for an object in an image as meta data.

As a conventional technique for transmitting the positional information for an object in an image as meta data, Japanese Patent Application Laid-Open No. 2010-9134 discloses a technique in which a camera transmits meta data including the positional information for an object detected from an image to a client.

When transmitting the positional information for an object detected from an image to an external apparatus, a method is considered that transmits the positional information for the detected object for every image in frames constituting a video to an external apparatus. However, even in a case where it is not necessary to transmit the positional information for a certain object a plurality of times, as in a case where an object position remains unchanged in a series of images, the positional information is transmitted, resulting in an increase in an amount of information to be transmitted.

SUMMARY OF THE DISCLOSURE

For example, the imaging apparatus according to the present disclosure includes the following configuration to suppress an increase in an amount of information to be transmitted in transmitting meta data related to an object detected from an image.

According to an aspect of the present disclosure, an imaging apparatus includes a processor executing instructions which, when executed by the processor, cause the imaging apparatus to detect an object included in an image captured by an imaging unit, generate meta data conforming to annotated regions supplemental enhancement information (ARSEI) including positional information for the object detected from the image, and transmit transmission data including coded data generated by encoding the image and the meta data related to the image to an external apparatus, wherein, in a case where a variation of a parameter of a first object detected from a second image captured after a first image with respect to the parameter of the first object detected from the first image is less than a threshold value, meta data not including positional information for the first object in the second image is generated as meta data related to the second image.

Further features of the present disclosure will become apparent from the following description of exemplary embodiments with reference to the attached drawings.

BRIEF DESCRIPTION OF THE DRAWINGS

FIG. 3 including FIGS. 3A and 3B illustrates a data structure conforming to annotated regions supplemental enhancement information (ARSEI).

DESCRIPTION OF THE EMBODIMENTS

Exemplary embodiments according to the present disclosure will be described below with reference to the accompanying drawings. Configurations described in the following exemplary embodiments are to be considered as illustrative, and the present disclosure is not limited to the illustrated configurations.

Figure 1:
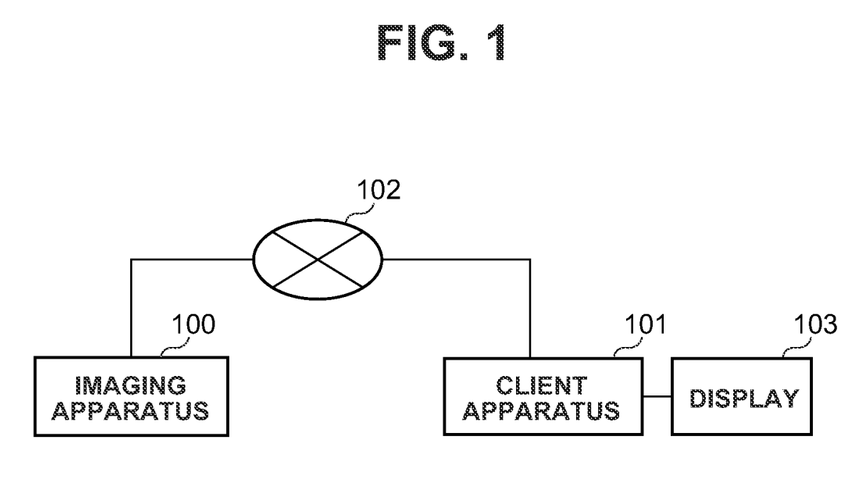
FIG. 1 illustrates a system configuration.

FIG. 1 illustrates a system configuration according to a first exemplary embodiment. A system according to the first exemplary embodiment includes an imaging apparatus 100, a client apparatus 101, a display 103, and a network 102.

The imaging apparatus 100 and the client apparatus 101 are connected with each other via the network 102. The network 102 is implemented, for example, by a plurality of routers, switches, and cables conforming to communication standards such as Ethernet®.

The network 102 may be implemented by the Internet, wireline Local Area Network (LAN), wireless LAN, and Wide Area Network (WAN).

The imaging apparatus 100 captures an image and also functions as an image processing apparatus for processing an image. The imaging apparatus 100 encodes the captured image to obtain coded data and transmits transmission data including the coded data to an external apparatus such as the client apparatus 101 via the network 102. The client apparatus 101 is an information processing apparatus such as a personal computer in which a program for implementing a processing function (described below) is installed.

The client apparatus 101 decodes the coded data included in the transmission data transmitted from the imaging apparatus 100, to obtain a decoded image. The display 103 including a liquid crystal display (LCD) displays the decoded image. The display 103 is connected with the client apparatus 101 via a display cable conforming to a communication standard such as high-definition multimedia interface (HDMI®). The display 103 and the client apparatus 101 may be provided in a single housing.

Figure 2:
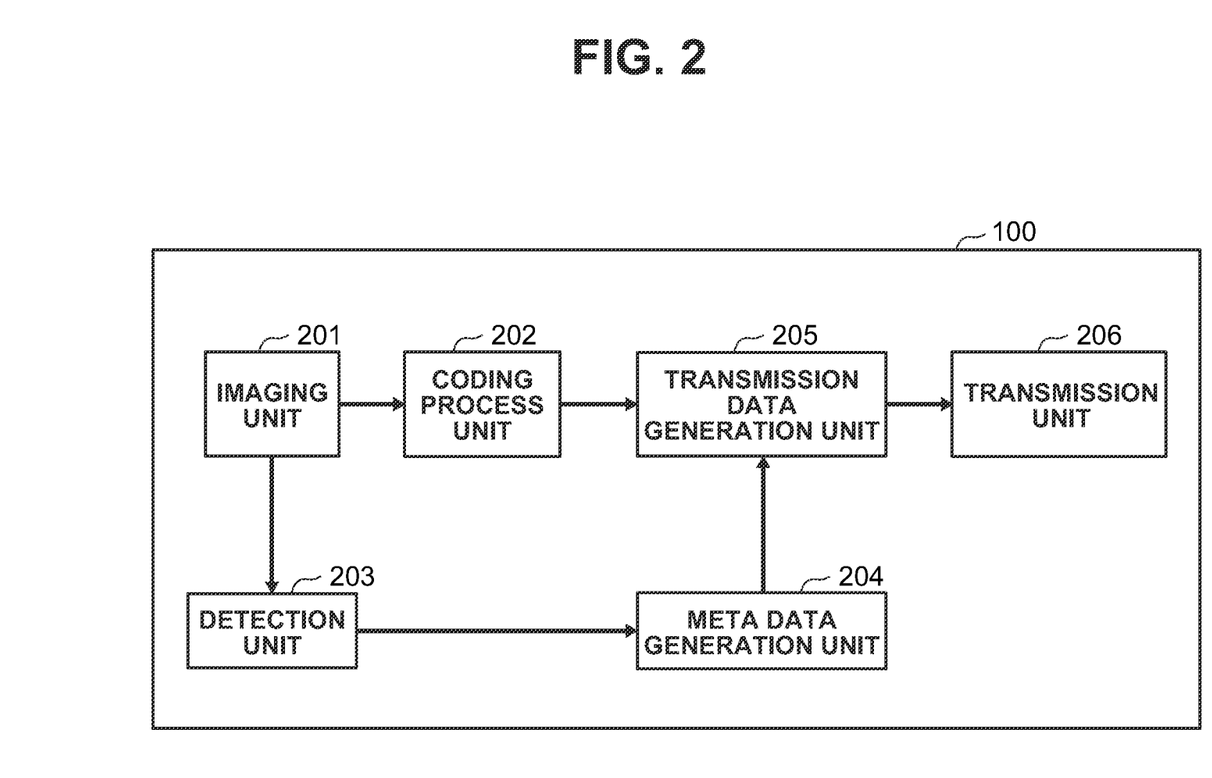
FIG. 2 illustrates functional blocks of an imaging apparatus.

The imaging apparatus 100 will be described below with reference to functional blocks illustrated in FIG. 2. FIG. 2 illustrates the functional blocks of the imaging apparatus 100 according to the present exemplary embodiment. A function of each functional block illustrated in FIG. 2 is implemented, for example, by a central processing unit (CPU) 800 of the imaging apparatus 100 executing a computer program stored, for example, in a read-only memory (ROM) 820 of the imaging apparatus 100 (described below with reference to FIG. 8).

An imaging unit 201 captures a subject image by using an image sensor such as a charge coupled device (CCD) sensor and a complementary metal-oxide semiconductor (CMOS) sensor, and subjects the image to photoelectric conversion to generate an electrical signal. The imaging unit 201 converts the photoelectrically converted electrical signal into a digital signal to generate an image.

A coding process unit 202 subjects the image captured by the imaging unit 201 to encoding process to generate coded data of the image. As the coding process unit 202 according to the present exemplary embodiment, for example, a High Efficiency Video Coding (HEVC) standard is used.

A detection unit 203 detects an object included in the image input from the imaging unit 201. In the present exemplary embodiment, it is described that objects to be detected will be persons. The detection unit 203 detects persons included in the image, for example, by performing pattern matching based on collation patterns (dictionary). In detecting persons from an image, a person may be detected from the image by using a plurality of collation patterns including collation patterns when the person faces front and collation patterns when the person turns sideways. By performing detection processing by using a plurality of collation patterns in this way, the improvement in detection accuracy can be expected.

While, in the present exemplary embodiment, persons will be the objects to be detected from an image, examples of objects to be detected include not only persons but also automobiles and other objects. While, in the present exemplary embodiment, the detection unit 203 performs pattern matching processing to detect an object from an image, the detection unit 203 may detect an object from an image by using other conventional techniques for object detection.

A meta data generation unit 204 generates meta data related to an image based on a result of object detection from the image by the detection unit 203. While, in the present exemplary embodiment, the meta data generation unit 204 generates meta data conforming to annotated regions supplemental enhancement information (ARSEI), the meta data generation unit 204 may generate meta data conforming to other formats.

A transmission data generation unit 205 generates transmission data including coded data obtained through the encoding process on the image captured by the imaging unit 201, and meta data generated by the meta data generation unit 204 based on the result of the object detection from the image.

A transmission unit 206 transmits the transmission data generated by the transmission data generation unit 205 to an external apparatus via the network 102.

Figures 3, 3A:
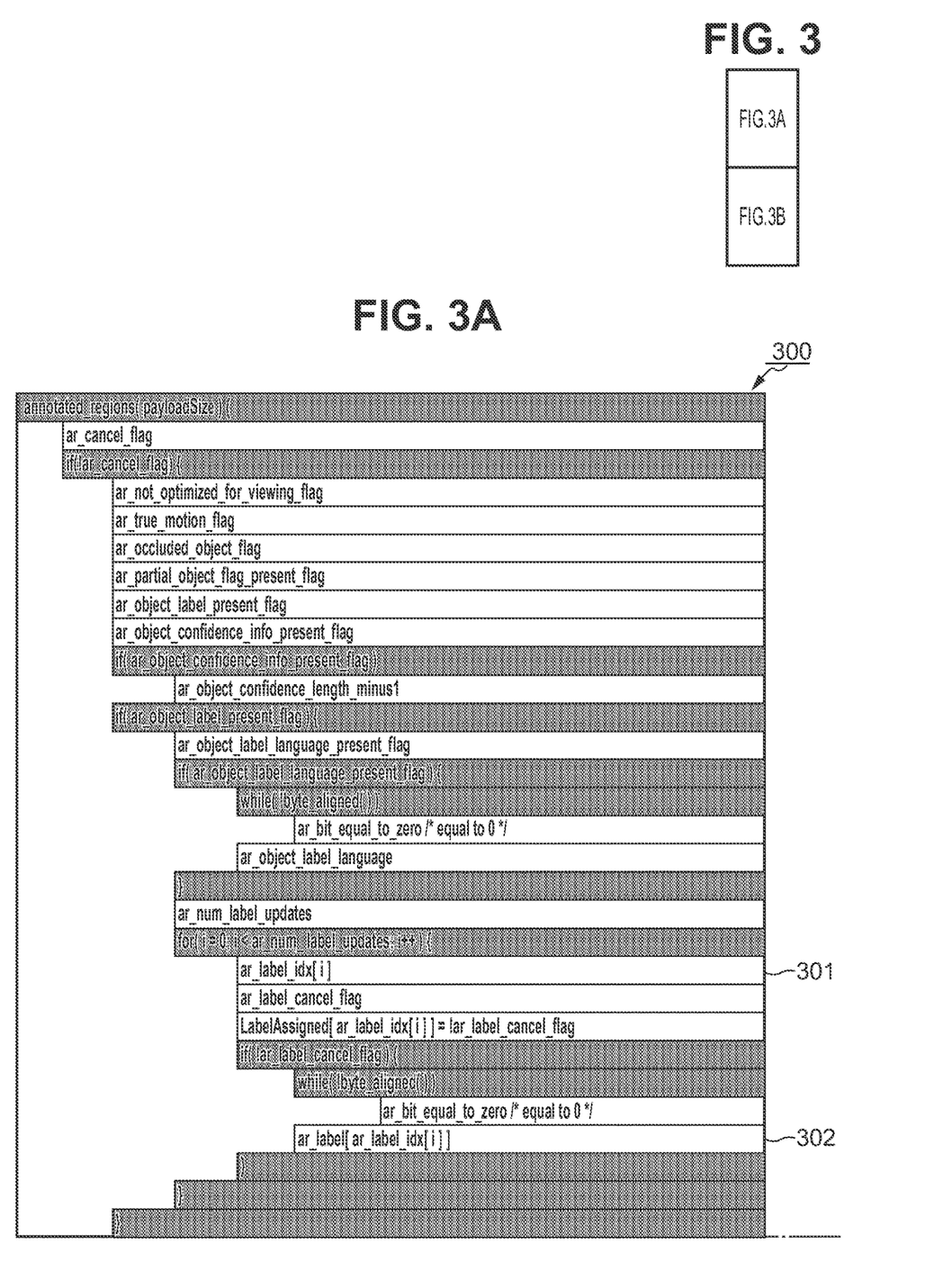
Figure 3B:
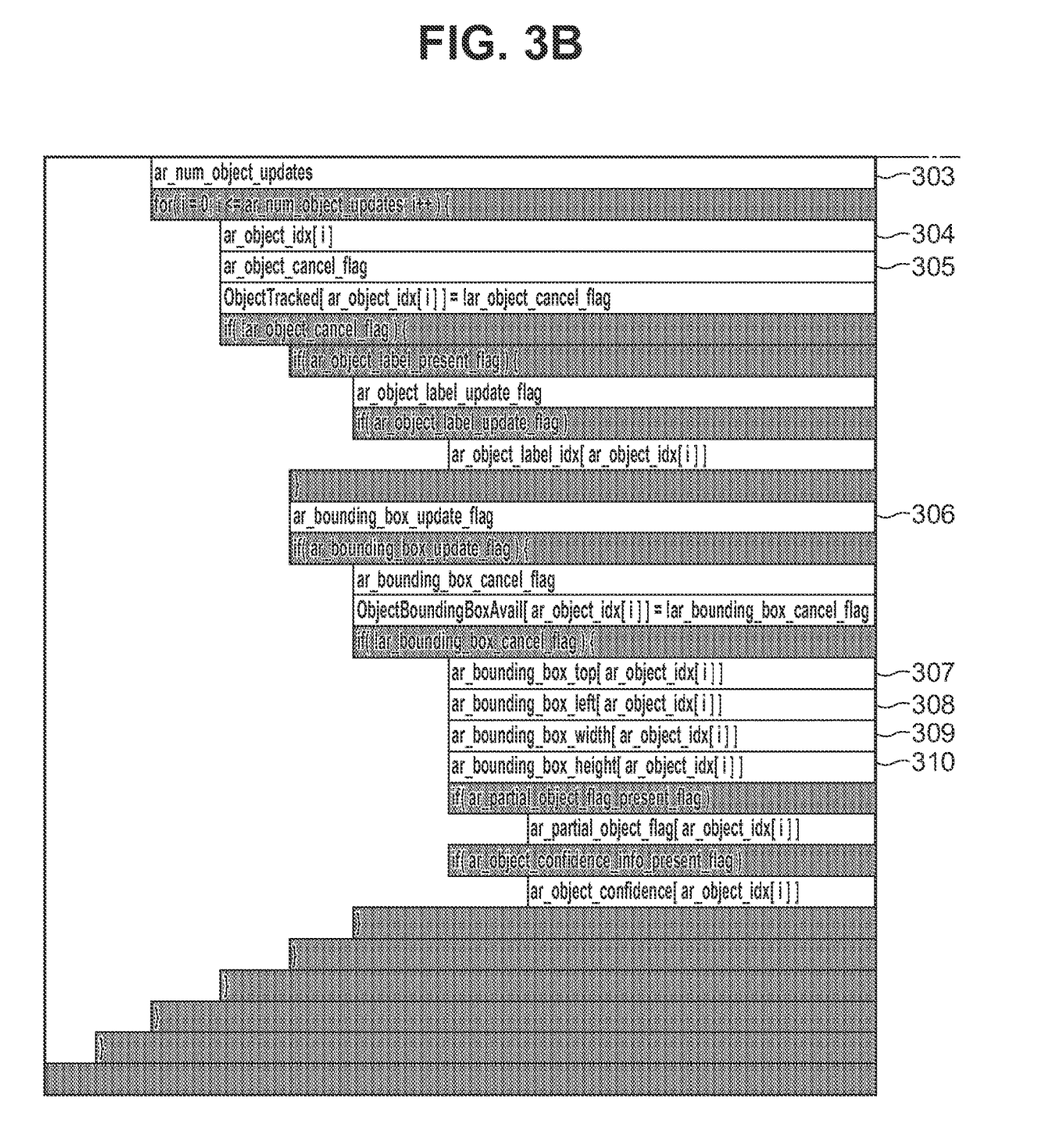

FIGS. 3A and 3B illustrates ARSEI-based data used in the present exemplary embodiment. In the present exemplary embodiment, the generation of ARSEI-based meta data by the meta data generation unit 204 will be described below with reference to FIGS. 3A and 3B.

Data 300 illustrated in FIGS. 3A and 3B indicates an ARSEI-based data structure described as pseudo codes. Referring to the data 300, gray lines are portions related to data structure control, and white lines are portions where actual data is to be stored if storage target data exists under the data structure control in the gray lines. ARSEI includes ar_label_idx[i] (301) that identifies ar_label (302) for storing information (such as characters) of up to 255 bytes, and ar_object_idx[i] (304) that identifies objects in the image. For each of ar_label_idx[i] and ar_object_idx[i], up to 256 data elements can be registered. When an object is updated, which label is to be assigned to the object can be determined.

Now, ar_num_object_updates (303) in the data 300 conforming to ARSEI and associated with a certain image indicates the number of objects to be subjected to the information update among the objects in the certain image. For example, when information about two different objects is updated in a state where three different objects are detected in a certain captured image by the detection unit 203, the value of ar_num_object_updates (303) in the data 300 in the certain image is 2. When ar_num_object_updates (303) is not zero (1 or larger), an index (a number from 0 to 255) that identifies the object to be subjected to the positional information update is input in ar_object_idx[i] (304). Assume an example case where indices "0", "1", and "2" are assigned as ar_object_idx (304) to three different objects detected in the image of a previous frame, and the positional information needs to be updated only for the object assigned the index "2" in the image of a current frame. In the data 300 generated for the image of the current frame, "2" is stored in ar_object_idx[0] (304), and ar_bounding_box_update_flag (306) is set to 1. Then, the positional information for the top left corner of a bounding box of the object assigned the index "2" in the image of the current frame is stored in ar_bounding_box_top (307) and ar_bounding_box_left (308). Information about the width of the bounding box is stored in ar_bounding_box_width (309). Information about the height of the bounding box is stored in ar_bounding_box_height (310).

By setting ar_object_cancel_flag (305) for ar_object_idx[i] (304) of a certain numerical value to 1, information about the object in ar_object_idx (304) can be deleted.

The meta data generation unit 204 stores information such as ar_object_idx (304) in the data 300 based on the result of the object detection for the image, and generates a Network Abstraction Layer (NAL) unit corresponding to the data 300 as meta data related to the image.

The maximum number of updatable objects to be handled by ARSEI is predetermined to be 255 in the specification. In ARSEI, the coordinates of the top left corner of the bounding box of an object are represented by two-dimensional 4-byte coordinates, and each of the width and height of the bounding box is represented by 2 bytes. Thus, the positional information for the object is represented by a total of 8 bytes. If the positional information is updated at 30 frames per seconds (FPS) for each of 255 objects in the image, the amount of information (8 bytes*255*30≈500 kbps) is required just for updating the positional information. If the positional information (ar_bounding_box_top and ar_bounding_box_left) and size information (ar_bounding_box_width and ar_bounding_box_height) for all objects are updated for each image constituting a moving image in this way, the amount of information to be transmitted increases, possibly oppressing a network bandwidth. For this reason, the meta data generation unit 204 according to the present exemplary embodiment identifies a variation of a parameter of a first object detected from a second image captured after a first image with respect to the parameter of the first object detected from the first image. Then, the meta data generation unit 204 compares the identified variation with a predetermined threshold value. When the variation is less than the predetermined threshold value, the meta data generation unit 204 generates meta data not including the positional or size information for the first object, as meta data related to the second image. On the other hand, when the variation is equal to or larger than the predetermined threshold value, the meta data generation unit 204 generates meta data including the positional and size information for the first object, as the meta data related to the second image.

Figure 4:
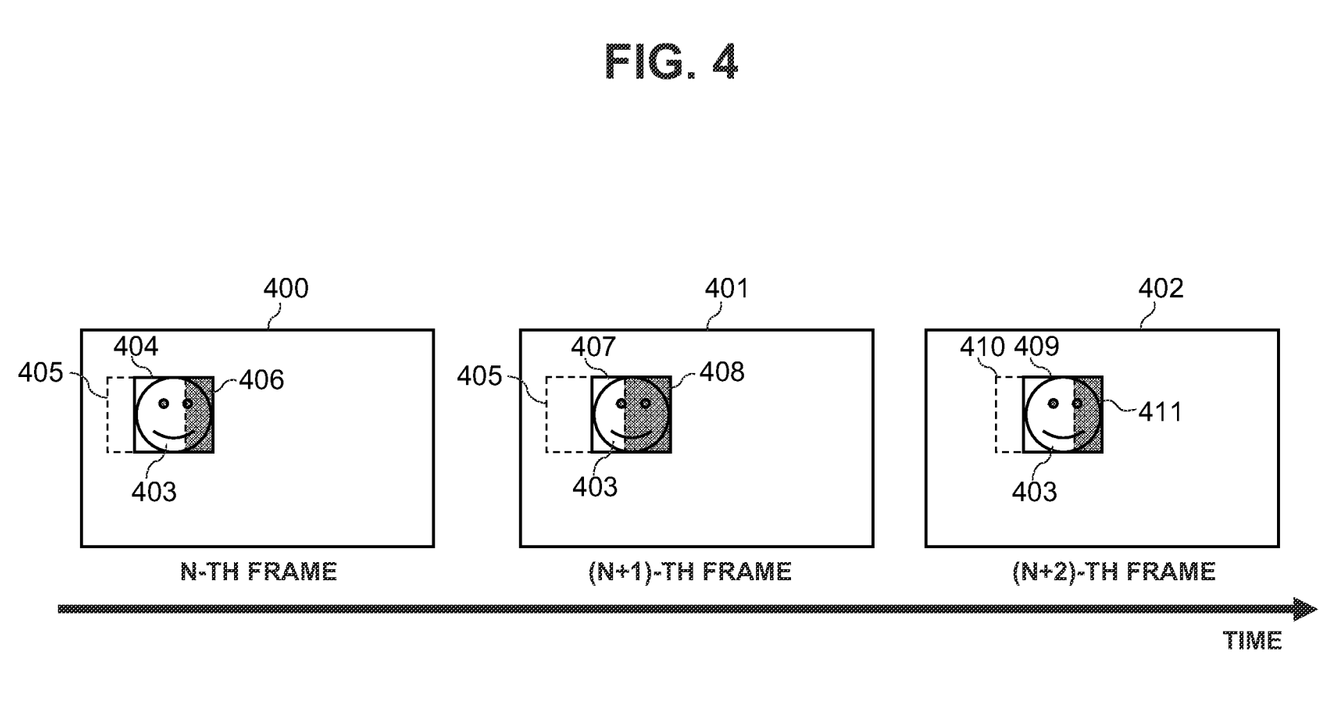
FIG. 4 illustrates processing for generating meta data.

Processing for meta data generation by the imaging apparatus 100 according to the present exemplary embodiment will be described below with reference to FIG. 4. FIG. 4 illustrates a series of images 400 to 402 captured by the imaging unit 201. In time series, the image 400 corresponds to the N-th frame (N is an integer), the image 401 corresponds to the (N+1)-th frame as the image captured next to the image 400, and the image 402 corresponds to the (N+2)-th frame as the image captured next to the image 401. As illustrated in FIG. 4, objects 403 being the same object are detected from the images 400 to 402 by the detection unit 203. In the image 400 that is the N-th frame, a circumscribed rectangle 404 indicates the bounding box of the object 403 detected from the image 400. A broken-line frame 405 in the image 400 indicates a circumscribed rectangle of the object 403 in a frame preceding the image 400, i.e., the frame at the time of the last transmission of the positional information in conformance with ARSEI for the object 403. More specifically, the broken-line frame 405 in the image 400 indicates a position and size of the object 403 at the time of the last transmission of ARSEI-based information for the object 403 in the image 400.

The meta data generation unit 204 identifies, as the variation, the size of an area 406 not overlapping an area of the broken-line frame 405 or an area of the circumscribed rectangle 404 in the image 400 that is a current processing target frame (hereinafter the area 406 is referred to as a non-overlapping area). Based on the size of the non-overlapping area 406, the meta data generation unit 204 according to the present exemplary embodiment determines whether to include the positional and size information for the object 403 in the meta data related to the image 400. For example, the meta data generation unit 204 compares the size of the non-overlapping area 406 of the object 403 with a predetermined threshold value. When the meta data generation unit 204 determines that the size of the non-overlapping area 406 is less than the predetermined threshold value, the meta data generation unit 204 does not include the positional or size information for the object 403 in the meta data. In this case, the meta data generation unit 204 does not update ar_bounding_box_top (307), ar_bounding_box_left (308), ar_bounding_box_width (309), or ar_bounding_box_height (310) of the object 403 in the data 300 related to the image 400. On the other hand, when the meta data generation unit 204 determines that the size of the non-overlapping area 406 is equal to or larger than the predetermined threshold value, the meta data generation unit 204 includes the positional and size information for the object 403 in the meta data. In this case, the meta data generation unit 204 updates ar_bounding_box_top (307), ar_bounding_box_left (308), ar_bounding_box_width (309), and ar_bounding_box_height (310) based on the positional and size information for the object 403 in the image 400, in the data 300 related to the image 400.

The present exemplary embodiment has been described above using a case where the meta data generation unit 204 compares the size of the non-overlapping area 406 with the predetermined threshold value, and determines whether to include the positional and size information in the meta data based on a result of the comparison. However, the present exemplary embodiment is not limited thereto. For example, the meta data generation unit 204 may identify a ratio of the size of the non-overlapping area 406 to the size of the area determined by the circumscribed rectangle 404 in the image 400 (the area inside the circumscribed rectangle 404), and compare the ratio with a predetermined threshold value. When the ratio is less than the predetermined threshold value, the meta data generation unit 204 does not update ar_bounding_box_top (307), ar_bounding_box_left (308), ar_bounding_box_width (309), or ar_bounding_box_height (310). On the other hand, when the ratio is equal to or larger than the predetermined threshold value, the meta data generation unit 204 updates ar_bounding_box_top (307), ar_bounding_box_left (308), ar_bounding_box_width (309), and ar_bounding_box_height (310). In the example illustrated in FIG. 4, the size of the non-overlapping area 406 of the object 403 in the image 400 is assumed to be less than the predetermined threshold value. Therefore, for the object 403, ar_bounding_box_top (307), ar_bounding_box_left (308), ar_bounding_box_width (309), and ar_bounding_box_height (310) are not updated.

In the image 401 corresponding to the (N+1)-th frame, a circumscribed rectangle 407 indicates the bounding box of the object 403 detected in the image 401. As described above, the broken-line frame 405 indicates the circumscribed rectangle of the object 403 in the frame at the time of the last transmission of the positional information in conformance with ARSEI for the object 403. Since the positional information has not been transmitted in conformance with ARSEI for the object 403 in the image 400, the broken-line frame 405 is disposed at the same position in the images 400 and 401. The meta data generation unit 204 identifies a non-overlapping area 408, with the area of the broken-line frame 405, of the area of the circumscribed rectangle 407 in the image 401 that is the current processing target frame. Then, based on the size of the non-overlapping area 408, the meta data generation unit 204 determines whether to include the positional and size information for the object 403 in the meta data related to the image 401. In the example illustrated in FIG. 4, the size of the non-overlapping area 408 for the object 403 in the image 401 is assumed to be equal to or larger than the predetermined threshold value. Therefore, the meta data generation unit 204 updates ar_bounding_box_top (307), ar_bounding_box_left (308), ar_bounding_box_width (309), and ar_bounding_box_height (310) based on the positional and size information for the object 403 in the image 401 as the meta data of the image 401.

In the image 402 that is the (N+2)-th frame, a circumscribed rectangle 409 indicates the bounding box of the object 403 detected in the image 402. A broken-line frame 410 indicates the circumscribed rectangle of the object 403 in the frame at the time of the last ARSEI-based information transmission for the object 403 in the image 402. More specifically, in the example illustrated in FIG. 4, the position of the broken-line frame 410 corresponds to the position of the circumscribed rectangle 407 of the object 403 in the image 401. The meta data generation unit 204 identifies a non-overlapping area 411, with the area of the broken-line frame 410, of the area of the circumscribed rectangle 409 in the image 402 that is the current processing target frame. Then, based on the size of the non-overlapping area 411, the meta data generation unit 204 determines whether to include the positional and size information for the object 403 in the meta data related to the image 402. In the example illustrated in FIG. 4, the size of the non-overlapping area 411 for the object 403 in the image 402 is assumed to be less than the predetermined threshold value. Therefore, the meta data generation unit 204 does not update ar_bounding_box_top (307), ar_bounding_box_left (308), ar_bounding_box_width (309), or ar_bounding_box_height (310) of the object 403 in the image 402 as the meta data in the image 402.

As described above, the meta data generation unit 204 identifies the area of the circumscribed rectangle of the first object in the first image at the time of the last transmission of the positional information as the parameter of the first object in the first image. The meta data generation unit 204 also identifies the area of the circumscribed rectangle of the first object detected from the second image captured after the first image as the parameter of the first object in the second image. Then, the meta data generation unit 204 identifies the size of the non-overlapping area as the variation of the parameter of the first object detected from the second image captured after the first image with respect to the parameter of the first object in the first image.

Then, the meta data generation unit 204 determines whether to include the positional information for the certain object in the meta data of the image that is the current processing target based on a result of comparison between the size of the non-overlapping area and the predetermined threshold value. Thus, the meta data generation unit 204 determines whether to include the positional and size information for the object in the meta data for the processing target image based on the variation of the parameter from the timing of the last transmission of the ARSEI-based positional and size information. Performing processing in this way enables reduction of the amount of information of the meta data to be transmitted in comparison with the case of transmitting meta data including the positional and size information for a certain object for all images in a uniform way.

Figure 5:
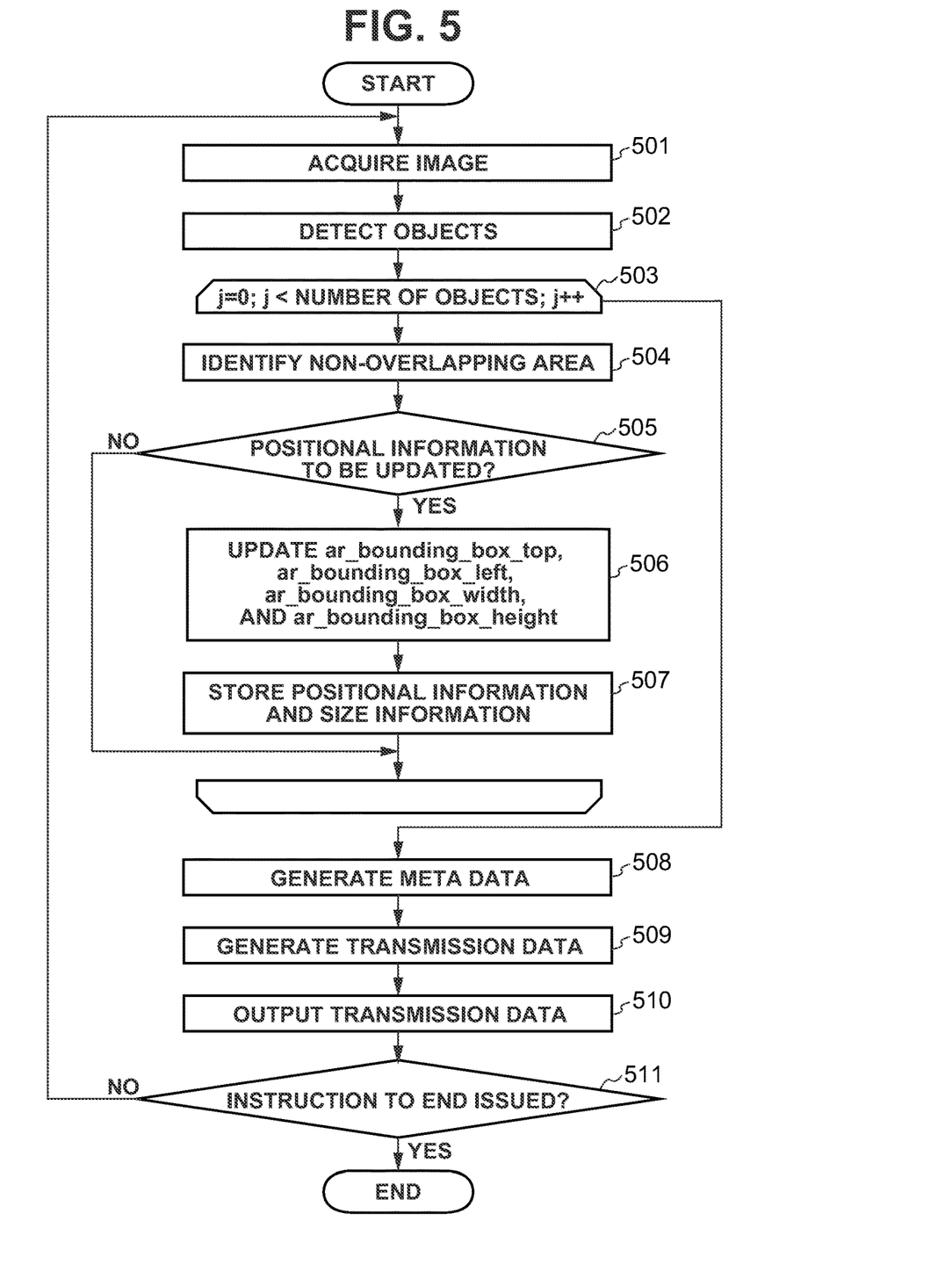
FIG. 5 is a flowchart illustrating a procedure of the processing for generating meta data.

Processing for meta data generation by the imaging apparatus 100 according to the present exemplary embodiment will be described below with reference to FIG. 5. The processing of the flowchart illustrated in FIG. 5 is to be executed, for example, by the functional blocks illustrated in FIG. 2, which are implemented by the CPU 800 of the imaging apparatus 100 executing computer programs stored in the ROM 820 of the imaging apparatus 100.

In step S501, the detection unit 203 acquires an image captured by the imaging unit 201, which is the current processing target image. In step S502, the detection unit 203 subjects the image acquired in step S501 to object detection processing. In step S503, the meta data generation unit 204 initializes j to zero. When a condition "j<number of objects" is satisfied, the meta data generation unit 204 executes the processing in steps S504 to S507. Each time the processing in steps S504 to 507 is executed, the meta data generation unit 204 increments j by one. The number of objects indicates the number of objects detected from the current processing target image. Thus, the processing in steps S504 to 507 is executed for each of the objects in the current processing target image.

In step S504, the meta data generation unit 204 performs the following processing. More specifically, the meta data generation unit 204 identifies the non-overlapping area based on the area of the circumscribed rectangle of an object in the current processing target image (hereinafter referred to as a target object) and the area of the circumscribed rectangle of the target object in the image obtained at the time of last inclusion of information about the target object in the meta data. In step S504, when the current processing target image is the image 400 illustrated in FIG. 4, the meta data generation unit 204 identifies the non-overlapping area 406.

In step S505, the meta data generation unit 204 determines whether to update the positional and size information based on the size of the non-overlapping area of the target object in the current processing target image identified in step S504. As it has been describe above with reference to FIG. 4, the meta data generation unit 204 performs, for example, the following processing. More specifically, when the size of the non-overlapping area of the target object is larger than or equal to the predetermined threshold value, the meta data generation unit 204 determines to update the positional and size information (YES in step S505). On the other hand, when the size of the non-overlapping area is less than the predetermined threshold value, the meta data generation unit 204 determines not to update the positional and size information (NO in step S505). When the meta data generation unit 204 determines not to update the positional and size information (NO in step S505), the processing returns to step S503. In step S503, the meta data generation unit 204 increments j by one and performs the processing in steps S504 to 507 on the next target object. When the meta data generation unit 204 determines to update the positional and size information (YES in step S505), the processing proceeds to step S506. In step S506, the meta data generation unit 204 stores the positional information for the target object in the image in ar_bounding_box_top (307) and ar_bounding_box_left (308) as the data 300 of the current processing target image, and stores the size information for the target object (the width and height of the bounding box) in ar_bounding_box_width (309) and ar_bounding_box_height (310).

In step S507, the meta data generation unit 204 stores the positional and size information for the target object in the current processing target image. Then, the processing returns to step S503. In step S503, the meta data generation unit 204 increments j by one and performs the processing in steps S504 to 507 on the next target object. When the condition "j<number of objects" is not satisfied in step S503, i.e., when the processing in steps S504 to 507 has been executed for all of the objects in the current processing target image, the processing proceeds to step S508.

In step S508, the meta data generation unit 204 generates a NAL unit corresponding to the data 300 storing object information for the current processing target image, as the meta data related to the image.

In step S509, the transmission data generation unit 205 generates transmission data including the meta data generated for the current processing target image and the coded data generated in the encoding process for the image. For example, the transmission data generation unit 205 generates the transmission data by storing the meta data generated for an image in a header portion of the coded data of the image. In step S510, the transmission unit 206 outputs the transmission data generated in step S509 to an external apparatus. In step S511, if an end instruction is issued by the user (YES in step S511), the processing exits the flowchart illustrated in FIG. 5. On the other hand, if an end instruction is not issued by the user (NO in step S511), the processing returns to step S501, and the detection unit 203 acquires the next processing target image.

In the above descriptions, the size of the non-overlapping area is used as the variation of the parameter of the first object in the second image captured after the first image with respect to the parameter of the first object in the first image. However, this is not restrictive, and the variation of the positional information may also be applicable.

More specifically, the meta data generation unit 204 identifies the positional information (ar_bounding_box_top and ar_bounding_box_left) for the top left corner of the bounding box of the first object in the first image, as the parameter of the first object in the first image with which the positional and size information has been transmitted last for the first object. Likewise, the meta data generation unit 204 identifies the positional information (ar_bounding_box_top and ar_bounding_box_left) for the top left corner of the bounding box of the first object in the second image as the parameter of the first object in the second image captured after the first image. Then, the meta data generation unit 204 identifies the following information as the variation of the parameter of the first object in the second image with respect to the parameter of the first object in the first image. More specifically, the meta data generation unit 204 identifies the variation between the position of the top left corner of the bounding box of the first object in the first image and the position of the top left corner of the bounding box of the first object in the second image. The meta data generation unit 204 compares the identified variation of the position with the predetermined threshold value, and, if the variation is less than the predetermined threshold value, does not include the positional and size information for the first object in the meta data for the second image. On the other hand, if the variation is larger than or equal to the predetermined threshold value, the meta data generation unit 204 includes the positional and size information for the first object in the meta data for the second image. In this way, the variation of the position of the first object may be used as the variation of the parameter of the first object in the second image with respect to the parameter of the first object in the first image.

As described above, the meta data generation unit 204 according to the present exemplary embodiment identifies the variation of the parameter of the first object detected from the second image captured after the first image with respect to the parameter of the first object detected from the first image. Then, the meta data generation unit 204 compares the identified variation with the predetermined threshold value, and, based on a result of comparison, determines whether to include the positional and size information for the first object in the meta data related to the second image. As for the parameter of a certain object, for example, when there is a small variation of the parameter of the certain object from the timing of the last transmission of the meta data including the positional and size information, the latest positional and size information is not included in the meta data. This enables suppressing an increase in the amount of information for the meta data to be transmitted to an external apparatus.

An imaging apparatus 100 according to a second exemplary embodiment identifies the variation of the parameter for each of a plurality of objects from an image, and selects an object to be subjected to inclusion of the positional and size information in the meta data based on the variation of the parameter for each object. Processing of the imaging apparatus 100 according to the second exemplary embodiment will be described below with reference to FIGS. 6 and 7. Portions different from those according to the first exemplary embodiment will be mainly described below. Components and processing identical or equivalent to those according to the first exemplary embodiment are assigned the same reference numerals, and redundant descriptions thereof will be omitted.

Processing of the imaging apparatus 100 according to the present exemplary embodiment will be described below with reference to FIG. 6.

Figure 6:
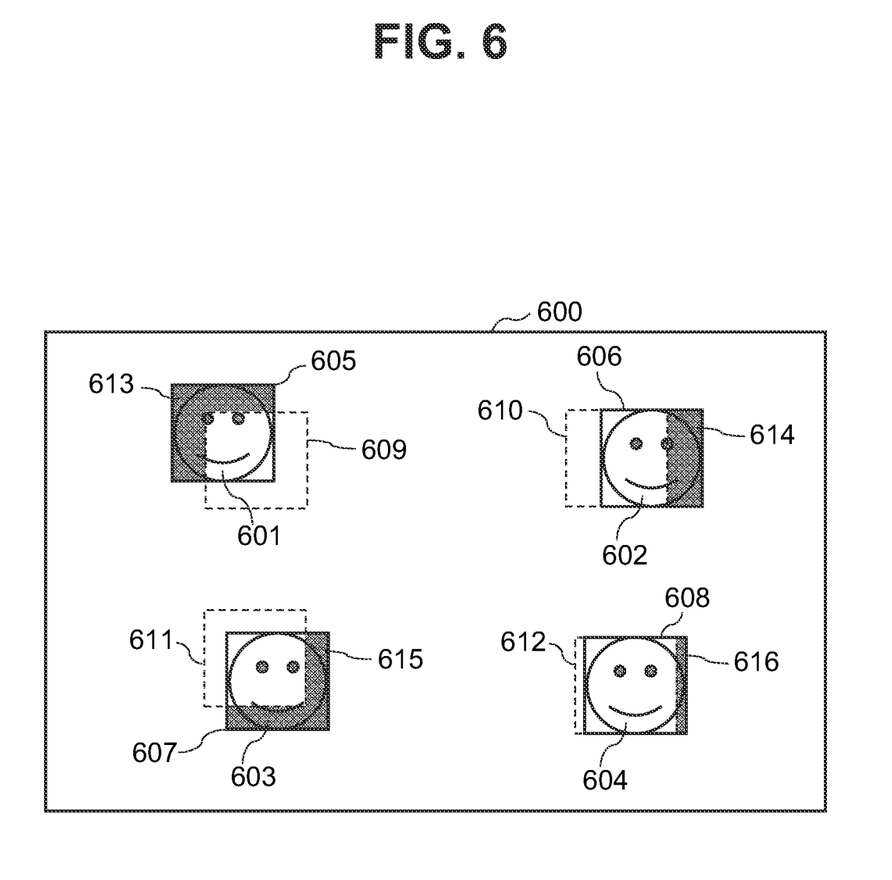
FIG. 6 illustrates processing for generating meta data.

An image 600 in FIG. 6 is the current processing target image. Four different objects 601 to 604 are detected by the detection unit 203. For each of the four objects 601 to 604 detected from the image 600, the meta data generation unit 204 identifies the variation of the parameter from the frame at the time of the last transmission of the positional and size information. In the present exemplary embodiment, the meta data generation unit 204 identifies the size of the non-overlapping area as the variation of the parameter, as in the descriptions in FIG. 4. The meta data generation unit 204 according to the present exemplary embodiment selects objects in descending order of the size of the non-overlapping area as long as the number of objects to be updated does not exceed a set number. The set number, which is an upper limit of the number of objects to be updated in one frame, may be specified by the user or may be set depending on the network bandwidth. An example case is described where the set number is "2". The meta data generation unit 204 selects objects in the descending order of the size of the non-overlapping area from among the objects having the size of the non-overlapping area exceeding a predetermined threshold value. In the example illustrated in FIG. 6, the meta data generation unit 204 performs the following processing. More specifically, among the objects 601 to 603 having the size of the non-overlapping area exceeding the predetermined threshold value, the meta data generation unit 204 selects the objects 601 and 603 in the descending order of the size of the non-overlapping area as long as the number of objects to be updated does not exceed the set number "2". Then, the meta data generation unit 204 includes the positional and size information for the objects 601 and 603 in the image 600 in the meta data of the image 600, but does not include the positional and size information for other objects (objects 602 and 604) in the meta data. More specifically, the meta data generation unit 204 according to the present exemplary embodiment selects objects in number larger than or equal to the set number based on the variation of the parameter of the objects in the image, and includes the positional and size information only for the selected objects in the meta data. Limiting the number of objects to be subjected to the inclusion of the positional and size information in the meta data in this way makes it possible to suppress an increase in the amount of information for the meta data to be transmitted to an external apparatus.

Figure 7:
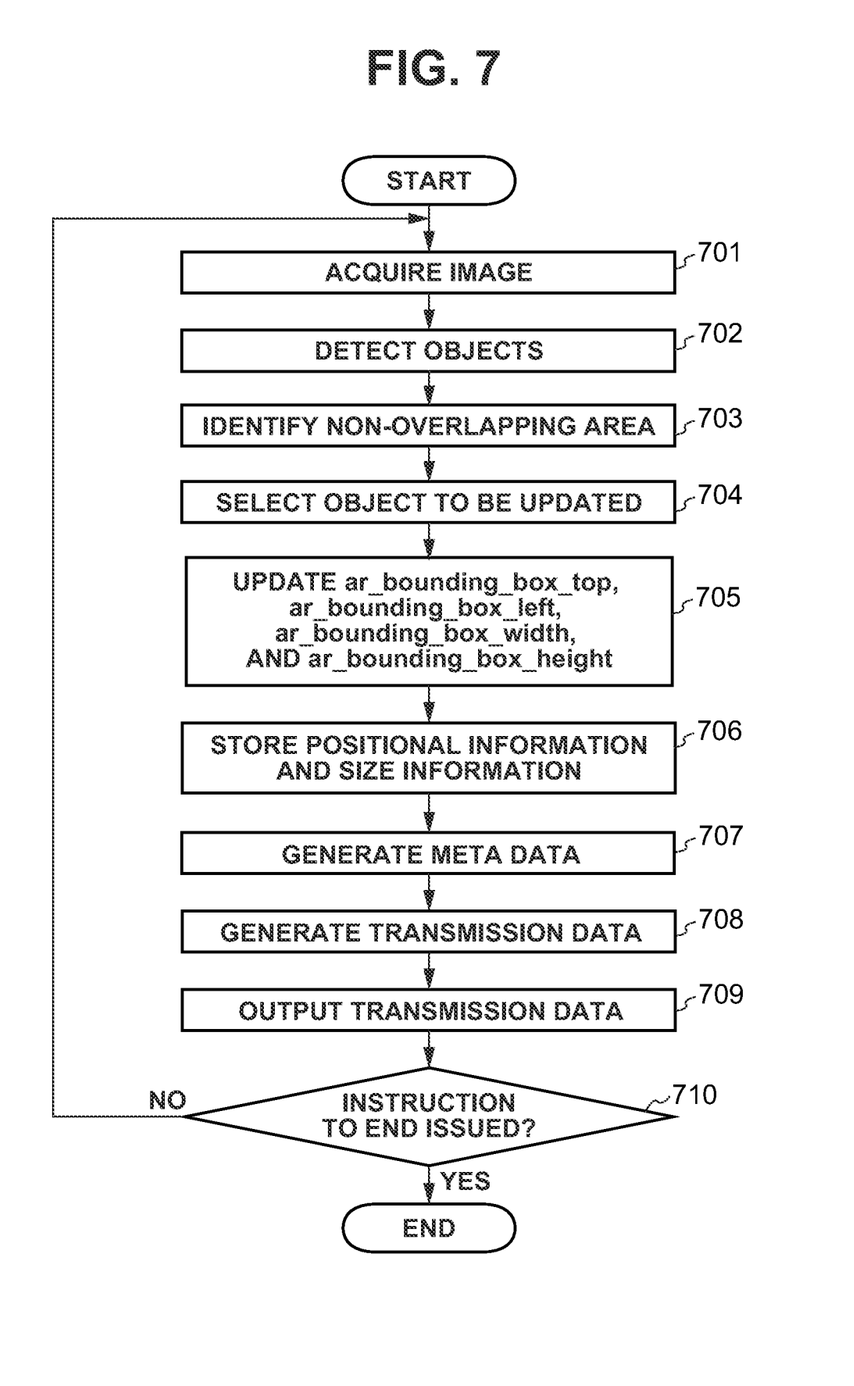
FIG. 7 is a flowchart illustrating a procedure of the processing for generating meta data.

Processing for meta data generation by the imaging apparatus 100 according to the present exemplary embodiment will be described below with reference to FIG. 7. The processing of the flowchart illustrated in FIG. 7 is to be executed, for example, by the functional blocks illustrated in FIG. 2, which are implemented by the CPU 800 of the imaging apparatus 100 executing computer programs stored in the ROM 820 of the imaging apparatus 100.

In step S701, the detection unit 203 acquires an image captured by the imaging unit 201, which is the current processing target image. In step S702, the detection unit 203 subjects the image acquired in step S701 to object detection processing. In step S703, the meta data generation unit 204 subjects each object in the current processing target image to the following processing to identify the non-overlapping area. More specifically, for each object, the meta data generation unit 204 identifies the non-overlapping area of the object based on the area of the circumscribed rectangle of the object in the image at the time of the last inclusion of the object information in the meta data and the area of the circumscribed rectangle of the object in the current processing target image. In step S703, when the current processing target image is the image 600 illustrated in FIG. 6, the meta data generation unit 204 identifies non-overlapping areas 613 to 616 for the objects 601 to 604, respectively.

In step S704, among the objects in the image, the meta data generation unit 204 updates an object to be subjected to the update of the positional and size information based on the size of the non-overlapping area for each object in the current processing target image and the set number. For example, from among the objects having the size of the non-overlapping area larger than or equal to the predetermined threshold value in the image, the meta data generation unit 204 selects objects in descending order of the size of the non-overlapping area as long as the number of objects to be selected does not exceed the set number. The processing is not limited thereto. The meta data generation unit 204 may select objects in the descending order of the size of the non-overlapping area as long as the number of objects to be selected does not exceed the set number without taking the predetermined threshold value into consideration.

In step S705, for each of the objects selected in step S704, the meta data generation unit 204 stores the positional information for the object in the image in ar_bounding_box_top, (307) and ar_bounding_box_left (308), and stores the size information (width and height of the bounding box) for the object in ar_bounding_box_width (309) and ar_bounding_box_height (310), as the data 300 of the current processing target image.

In step S706, the meta data generation unit 204 stores the positional and size information for the objects with updated positional and size information. In step S707, the meta data generation unit 204 generates a NAL unit corresponding to the data 300 storing object information for the current processing target image, as the meta data related to the image. In step S708, the transmission data generation unit 205 generates transmission data including the meta data generated for the current processing target image and the coded data generated in the encoding process for the image. For example, the transmission data generation unit 205 generates the transmission data by storing the meta data generated for the image in the header portion of the coded data of the image. In step S709, the transmission unit 206 outputs the transmission data generated in step S708 to an external apparatus. In step S710, if an end instruction is issued by the user (YES in step S710), the processing exits the flowchart illustrated in FIG. 7. On the other hand, if an end instruction is not issued by the user (NO in step S710), the processing returns to step S701, and the detection unit 203 acquires the next processing target image.

In the above descriptions, the meta data generation unit 204 uses the size of the non-overlapping area as the variation of the parameter of a certain object in the second image captured after the first image with respect to the parameter of the object in the first image that is the frame at the time of the last transmission of the positional information. However, as in the first exemplary embodiment, the meta data generation unit 204 may use the variation of the position of the top left corner of the bounding box of the object as the variation of the object.

As described above, the meta data generation unit 204 according to the present exemplary embodiment identifies the variation of the parameter of the first object detected from the second image captured after the first image with respect to the parameter of the first object detected from the first image. The meta data generation unit 204 selects an object to be subjected to the update of the positional and size information based on the identified variation and the set number, which is an upper limit of the number of objects to be updated. Then, the meta data generation unit 204 includes the positional and size information in the meta data for the selected objects. Limiting the number of objects to be subjected to the meta data update in this way makes it possible to suppress an increase in the amount of information for the meta data to be transmitted to an external apparatus.

Figure 8:
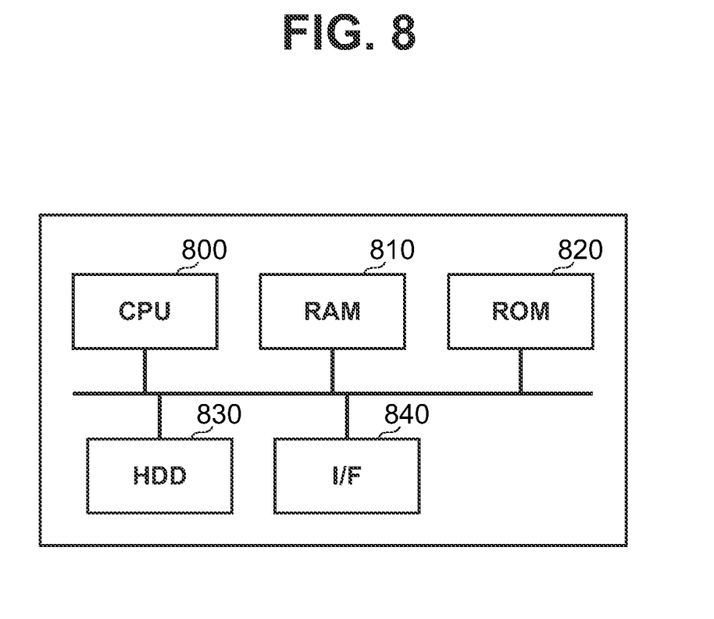
FIG. 8 illustrates an example of a hardware configuration of each apparatus.

A hardware configuration of the imaging apparatus 100 for implementing the functions according to the above-described exemplary embodiments will be described below with reference to FIG. 8. While the hardware configuration of the imaging apparatus 100 will be described below, an information processing apparatus 200 is also implemented by a similar hardware configuration.

The imaging apparatus 100 according to the present exemplary embodiment includes the CPU 800, a Random Access Memory (RAM) 810, the ROM 820, a Hard Disk Drive (HDD) 830, and an interface (I/F) 840.

The CPU 800 is a central processing unit that totally controls the imaging apparatus 100. The RAM 810 temporarily stores a computer program to be executed by the CPU 800. The RAM 810 provides a work area used by the CPU 800 to execute processing. The RAM 810 functions, for example, as a frame memory and a buffer memory.

The ROM 820 stores programs to be executed by the CPU 800 to control the information processing apparatus 200. The HDD 830 is a storage device for storing image data and the like.

The I/F 840 communicates with an external apparatus based on Transmission Control Protocol/Internet Protocol (TCP/IP) and Hypertext Transfer Protocol (HTTP) via the network 102.

While each exemplary embodiment has been described above using an example where the CPU 800 executes processing, at least part of the processing of the CPU 800 may be executed by dedicated hardware. For example, processing for loading a program code from the ROM 820 into the RAM 810 may be implemented through Direct Memory Access (DMA) that also functions as a transfer apparatus.

The present disclosure can also be realized by processing in which at least one processor reads and executes a program for implementing at least one of the functions of the above-described exemplary embodiments. The program may be supplied to a system or an apparatus having a processor via a network or a storage medium.

The present disclosure can also be achieved by a circuit (for example, an application specific integrated circuit (ASIC)) for implementing at least one of the functions of the above-described exemplary embodiments. Each unit of the imaging apparatus 100 may be implemented by hardware illustrated in FIG. 8 or implemented by software.

Another apparatus may have at least one of the functions of the imaging apparatus 100 according to the above-described exemplary embodiments. For example, the circuit may have at least one of the functions of the imaging apparatus 100 according to each of the exemplary embodiments. The above-described exemplary embodiments may be freely combined as an exemplary embodiment.

The present disclosure has been described above together with the exemplary embodiments. The above-described exemplary embodiments are to be merely considered as illustrative in embodying the present disclosure, and are not to be interpreted as limiting the technical scope of the present disclosure. The present disclosure may be embodied in diverse forms without departing from the technical concepts or essential characteristics thereof. For example, combinations of the above-described exemplary embodiments are also intended to be included in the disclosure of the present specification.

The above-described exemplary embodiments make it possible to suppress an increase in the amount of information to be transmitted in transmitting meta data related to an object detected from an image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-192446, filed Nov. 26, 2021, which is hereby incorporated by reference herein in its entirety.

What is claimed is:

1. An imaging apparatus comprising a processor executing instructions which, when executed by the processor, cause the imaging apparatus to:
    detect an object included in an image captured by an imaging unit;
    generate meta data conforming to annotated regions supplemental enhancement information (ARSEI) including positional information for the object detected from the image; and
    transmit transmission data including coded data generated by encoding the image and the meta data related to the image to an external apparatus,
    wherein, in a case where a variation of a parameter of a first object detected from a second image captured after a first image with respect to the parameter of the first object detected from the first image is less than a threshold value, meta data not including positional information for the first object in the second image is generated as meta data related to the second image.

2. The imaging apparatus according to claim 1, wherein, in a case where the variation is larger than or equal to the threshold value, meta data including the positional information for the first object in the second image is generated as the meta data related to the second image.

3. The imaging apparatus according to claim 1, wherein the meta data generated for the first image includes ar_object_idx for identifying the first object detected from the first image, and the positional and size information for the first object in the first image.

4. The imaging apparatus according to claim 3, wherein the positional information corresponds to ar_bounding_box_top and ar_bounding_box_left, and the size information corresponds to ar_bounding_box_width and ar_bounding_box_height.

5. The imaging apparatus according to claim 4, wherein, in a case where the variation is less than the threshold value, ar_bounding_box_top, ar_bounding_box_left, ar_bounding_box_width, and ar_bounding_box_height of the first object are not included in the meta data generated for the second image.

6. The imaging apparatus according to claim 1, wherein, in a case where a plurality of objects is detected from an image, the instructions cause the imaging apparatus to identify a variation of a parameter for each of the objects, and select an object to be subjected to inclusion of the positional information in the meta data based on the variation identified for each of the objects and a set number being an upper limit of the number of objects to be updated.

7. The imaging apparatus according to claim 1, wherein the variation is a quantity based on a size of a non-overlapping area of an area of the first object in the second image with an area of the first object in the first image.

8. The imaging apparatus according to claim 1, wherein the variation is a variation between a position of the first object in the first image and a position of the first object in the second image.

9. An information processing method comprising:
    detecting an object included in an image captured by an imaging unit;
    generating meta data conforming to annotated regions supplemental enhancement information (ARSEI) including positional information for the object detected from the image in the detecting; and
    transmitting transmission data including coded data generated by encoding the image and the meta data related to the image to an external apparatus,
    wherein, in a case where a variation of a parameter of a first object detected from a second image captured after a first image with respect to the parameter of the first object detected from the first image is less than a threshold value, meta data not including positional information for the first object in the second image is generated as meta data related to the second image.

10. A non-transitory computer readable medium storing a computer-executable program for causing a computer to perform an image processing method, the method comprising:
    detecting an object included in an image captured by an imaging unit;
    generating meta data conforming to annotated regions supplemental enhancement information (ARSEI) including positional information for the object detected from the image in the detecting; and
    transmitting transmission data including coded data generated by encoding the image and the meta data related to the image to an external apparatus,
    wherein, in a case where a variation of a parameter of a first object detected from a second image captured after a first image with respect to the parameter of the first object detected from the first image is less than a threshold value, meta data not including positional information for the first object in the second image is generated as meta data related to the second image.

* * * * *